United States Patent
Shiung

(10) Patent No.: US 7,395,289 B2
(45) Date of Patent: *Jul. 1, 2008

(54) FREQUENCY SYNTHESIZING AND BACK-END PROCESSING CIRCUIT AND METHOD THEREOF

(75) Inventor: David Shiung, Tainan (TW)

(73) Assignee: Novatek Microelectronics Corp., Hsinchu (TW)

( * ) Notice: Subject to any disclaimer, the term of this patent is extended or adjusted under 35 U.S.C. 154(b) by 690 days.

This patent is subject to a terminal disclaimer.

(21) Appl. No.: 10/709,824

(22) Filed: Jun. 1, 2004

(65) Prior Publication Data

US 2005/0168248 A1    Aug. 4, 2005

(30) Foreign Application Priority Data

Jan. 30, 2004    (TW) ............................. 93102108 A

(51) Int. Cl.
*G06F 1/02* (2006.01)
(52) U.S. Cl. ..................................... 708/272
(58) Field of Classification Search .......... 708/270–272
See application file for complete search history.

(56) References Cited

U.S. PATENT DOCUMENTS

| | | | | |
|---|---|---|---|---|
| 4,454,486 A | * | 6/1984 | Hassun et al. | 332/117 |
| 5,399,984 A | * | 3/1995 | Frank | 327/107 |
| 6,563,350 B1 | * | 5/2003 | Warner et al. | 327/107 |

* cited by examiner

*Primary Examiner*—Tan V. Mai
(74) *Attorney, Agent, or Firm*—Jianq Chyun IP Office

(57) ABSTRACT

A frequency synthesizing and back-end processing circuit and method thereof are provided. This circuit includes a fully digital frequency synthesizer by using interpolation and a linear feedback shift register to synthesize a frequency. After digital-to-analog conversion, it provides two options of the digital and analog signals. Then the selected signal will be mixed by the corresponding mixer. Finally, the filer removes the undesired noise to obtain the desired synthesized frequency signal. This frequency synthesizer does not require complex digital or analog circuits and can achieve a high frequency resolution with a lower circuit complexity, which is superior to the conventional art. The present invention also includes mixers for different frequencies and filters for back-end processing.

19 Claims, 1 Drawing Sheet

FREQUENCY SYNTHESIZING AND BACK-END PROCESSING CIRCUIT AND METHOD THEREOF

CROSS REFERENCE TO RELATED APPLICATIONS

This application claims the priority benefit of Taiwan application serial no. 93102108, filed on Jan. 30, 2004.

BACKGROUND OF INVENTION

1. Field of the Invention

This invention generally relates to a frequency synthesizing and back-end processing circuit and method thereof, and more particularly to a digital frequency synthesizing circuit including a linear feedback shift register, logic units, and an analog or digital mixer and a filter for backend processing.

2. Description of Related Art

In the conventional art, there are several frequency synthesizers such as direct frequency synthesizer, phase lock loop frequency synthesizer, and digital frequency synthesizer. Generally, a frequency synthesizing circuit for backend processing includes a phase lock loop, a mixer, and a filter. FIG. 1 is a conventional back-end processing circuit 100. Referring to FIG. 1, this circuit includes phase lock loop (102, 104, 106), a mixer (108), and a filter (110). The phase lock loop (PLL) includes phase detector 102, a low pass filter (LPF) 104, and a voltage controlled oscillator (VCO) 106. The PLL up-converts the received signal to a RF signal. The mixer 108 mixes the RF signal with the local oscillation frequency. The filter 110 then filters the mixed signal to obtain the synthesized frequency.

However, the conventional art has some drawbacks. First, the PLL is not a low power consuming device because it requires a relatively long period to transmit the precise frequency. Further, generally an analog circuit designer has to make a choice between signal stability and phase locking time, which usually causes a lose-lose situation. In addition, an analog circuit usually has fabrication migration issue and the quality of the signal will be affected due to the choice of the loop phase bandwidth of the analog PLL.

Hence, the present invention provides a fully digital frequency synthesizer and a more flexible back-end processing circuit, by using a digital circuit with a simplified analog circuit, to avoid the issue generated by the analog PLL.

SUMMARY OF INVENTION

The present invention is related to a fully digital frequency synthesizer.

According to an embodiment of the present invention, a back-end processing circuit is attached to the frequency synthesizer.

According to an embodiment of the present invention, the circuit with fully digital frequency synthesizer is provided by using interpolation and a linear feedback shift register (LFSR). The frequency synthesizer stores the binary data of two frequencies in a shift register and uses interpolation to synthesize a frequency ranged between two predetermined frequencies. The frequency resolution determined by the number of the stages of the LFSR.

The frequency synthesizer, in accordance with an embodiment of the present invention, uses two memory units to store two reference frequencies such as f1 and f2 in a form of a digital sequence. Theoretically, all frequencies ranged between these two reference frequencies can be synthesized by this structure of the present invention. The max resolution is $|f_1-f_2|/2^N$, wherein N is the number of the stages of the LFSR. The multiplexer in the frequency synthesizer is determined by a target value. The comparison result between the target value and a predetermined value will determine one of the two stored reference frequencies passes through the multiplexer. After the comparison is complete, the value in the LFSR will shift one bit and then the comparison repeats again. The frequency synthesizer consists of fully digital circuits and operates based on a system clock signal. Therefore, the frequency synthesizer of the present invention can achieve a high frequency resolution with a lower circuit complexity.

The synthesized frequency is a series of a binary digital sequence and is processed by a digital-to-analog converter so that the frequency synthesizer can provide digital and analog synthesized frequencies at the same time. If analog synthesized frequency is selected, the back-end processing circuit will use voltage controlled oscillator to mix the frequency. If digital synthesized frequency is selected, the back-end processing circuit will use numerical controlled oscillator to mix the frequency. Finally, the mixed frequency will be processed by a filter. This filer can be a low pass filter, a band pass filter, or a high pass filter. Also, the filter can be designed as a digital filter or an analog filter depending on the users need.

In an embodiment of the present invention, the frequency synthesizer can provide a high frequency resolution with a lower circuit complexity.

The above is a brief description of some deficiencies in the prior art and advantages of the present invention.

Other features, advantages and embodiments of the invention will be apparent to those skilled in the art from the following description, accompanying drawings and appended claims.

DETAILED DESCRIPTION

Figure 1:
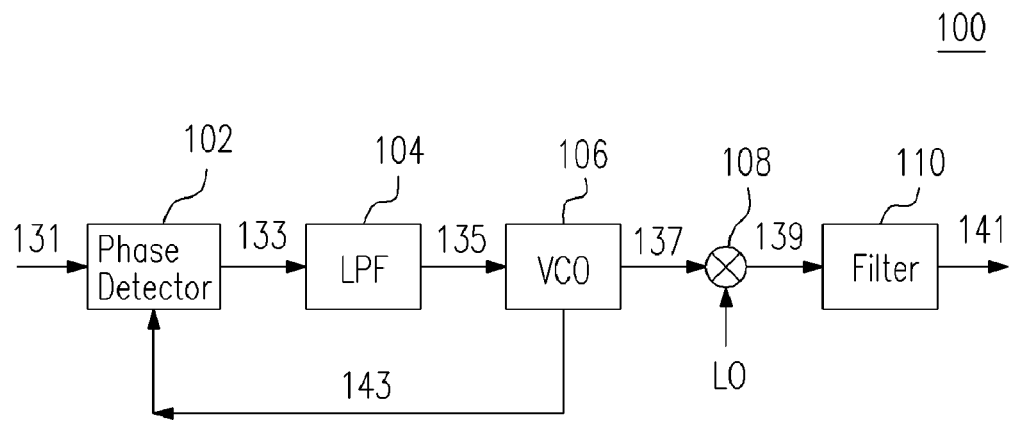
FIG. 1 is a conventional back-end processing circuit 100.
Figure 2:
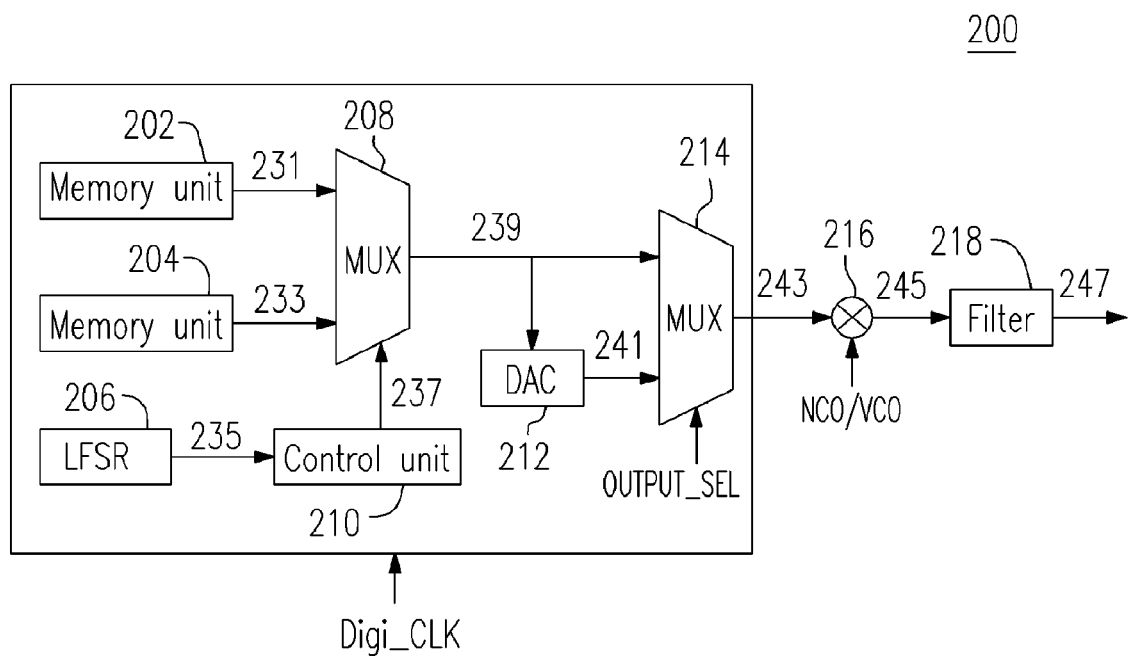
FIG. 2 is a block diagram of the frequency synthesizing and back-end processing circuit in accordance with an embodiment of the present invention.

FIG. 2 is a block diagram of the frequency synthesizing and back-end processing circuit in accordance with a preferred embodiment of the present invention.

The basic structure of the frequency synthesizer is shown in FIG. 2, wherein 'Seq. +' 202 and 'Seq. −' 204 are two memory units for storing the digital sequence of the reference frequencies f1 and f2 in the two sinusoidal waves $\sin(2\pi f_1 t)$ $\sin(2\pi f_2 t)$, for example, a binary sequence. These two reference frequencies are generated by reference system frequency. Theoretically, all frequencies ranged between these two reference frequencies can be synthesized by this structure of the present invention. The max resolution is $|f_1-f_2|/2^N$, wherein N is the number of the stages of the LFSR 206, i.e., the number of the shift registers in the LFSR. For example, to generate a binary digital sequence with a system frequency 13.392 MHz, the two reference frequencies can be set as 11393/66=202.909 kHz and 119392/67=199.881 kHz, respectively. Assuming that the desired synthesized frequency is 201 kHz, the value in the memory units 'Seq. +' 202 and 'Seq. −' 204 can be represented as "000000000000000011111111111111100000000000 00000-1-1-1-1-1-1-1-1-1-1-1-1-1-1-1-1" and "000000000000000011111111111111110000000000

000000-1-1-1-1-1-1-1-1-1-1-1-1-1-1-1-1". For simplification, these two sequences can be represented as 16/17/16/17 and 17/17/16/17. Because 11392/201=66.6269, the probability to transmit the data in 'Seq. +' is 0.6269; hence, the probability to transmit the data in 'Seq. −' is 0.3731 (i.e., 1−0.6269). If the LFSR 206 has 10 stages, the function generated by LFSR can be represented by a Galois structure $g(D)=1+D^3+D^{10}$. However, a Fibonacci structure can also be used. In an embodiment of the present invention, the number of the stages of the LFSR is 10. Therefore, the max resolution is $(202.909-199.881)/2^{10}=0.002957$ kHz, and the target frequency can be set as round (0.3721*1024)/1024= $0.3730_{(10)}=0101111110_{(2)}$. The LFSR will pre-store the target frequency. As shown in FIG. 2, the output of the first multiplexer 208 is determined by the control unit 210, which is based on the comparison between the target frequency in the LFSR 206 and the predetermined value. When the target frequency is smaller than the predetermined value, the control unit 210 will select to output the data 231 in 'Seq. +' memory unit 202. When the target frequency is larger than the predetermined value, the control unit 210 will select to output the data 233 in 'Seq. −' memory unit 204. The counter is controlled by the digital clock Digi_clk. After comparing a sequence, the value in the LFSR 206 will be shifted one bit, and the comparison will repeat again until the difference between synthesized frequency and the target frequency is smaller than the max resolution. Then a digital synthesized frequency 239 is obtained.

Then a digital-to-analog converter converts the digital synthesized frequency sequence 239 to an analog frequency signal 241. The second multiplexer 214 can selectively output one of the digital synthesized frequency sequence and the analog synthesized frequency signal, which is selected by the outer source or a user-predetermined control signal OUTPUT_SEL. This selected signal 243 then is sent to a mixer 216. If the digital synthesized frequency is selected, a numerical controlled oscillator will be used to mix the frequency. If analog synthesized frequency is selected, a voltage controlled oscillator will be used to mix the frequency. The mixing method is selected by the control signal OUTPUT_SEL.

Further, the mixed signal 245 is sent to a filter 218 to remove the noise. Here, the frequency synthesizing and back-end processing is complete. In an embodiment of the present invention, the filter can be a low pass filter, a band pass filter, or a high pass filter.

The above description provides a full and complete description of the preferred embodiments of the present invention. Various modifications, alternate construction, and equivalent may be made by those skilled in the art without changing the scope or spirit of the invention. Accordingly, the above description and illustrations should not be construed as limiting the scope of the invention which is defined by the following claims.

The invention claimed is:

1. A frequency synthesizing and back-end processing circuit, comprising:
   a frequency synthesizer, operated by a clock signal, said frequency synthesizer including
      a first multiplexer;
      a first memory unit, coupled to said first multiplexer, for storing a first reference frequency;
      a second memory unit, coupled to said first multiplexer, for storing a second reference frequency;
      a shift register, for storing a target frequency and comparing the target frequency with a predetermined value;
      a control unit, coupled to said shift register, said control unit based on a result of comparing said target frequency with said predetermined value selecting one of said first reference frequency and said second reference frequency passes said first multiplexer;
      a digital-to-analog converter, for converting a first signal passing through said first multiplexer to a second signal; and
      a second multiplexer, based on a control signal passing one of said first signal and said second signal to obtain a third signal; and
   a back-end processing circuit including
      a mixer, coupled to said second multiplexer for receiving said third signal; and
      a filter, coupled to said mixer.

2. The circuit of claim 1, wherein said shift register is a linear feedback shift register.

3. The circuit of claim 2, wherein said result of comparing said target frequency with said predetermined value determines one of said first reference frequency and said second reference frequency passes said first multiplexer, said target frequency then shifts one bit responsive to said clock signal for comparing with said predetermined value again until a frequency resolution cannot distinguish a difference between said target frequency and said predetermined value.

4. The circuit of claim 2, wherein the number of stages of said linear feedback shift register determines said frequency resolution, said frequency resolution is a ratio of a difference between said first frequency and said second frequency to a base 2 multiple exponential, said multiple is a number of said stages of said linear feedback shift register.

5. The circuit of claim 1, wherein when said control signal selects said first signal to pass through said second multiplexer, said mixer mixes said third signal and a signal generated by a numerical controlled oscillator.

6. The circuit of claim 1, wherein when said control signal selects said second signal to pass through said second multiplexer, said mixer mixes said third signal and a signal generated by a voltage controlled oscillator.

7. The circuit of claim 1, wherein said filter is a low pass filter.

8. The circuit of claim 1, wherein said filter is a band pass filter.

9. The circuit of claim 1, wherein said filter is a high pass filter.

10. A method for frequency synthesizing and back-end processing, comprising:
   comparing a target frequency with a predetermined value to obtain a comparing result;
   selecting one of a first reference frequency and a second reference frequency according to the comparing result to generate a digital signal having a selected reference frequency;
   converting the digital signal having the selected reference frequency into an analog signal;
   selecting one of the digital signal and the analog signal;
   mixing a signal selected from the digital signal and the analog signal to obtain a mixed signal; and
   filtering said mixed signal.

11. The method of claim 10, wherein the step of mixing a signal selected from the digital signal and the analog signal comprises:
   if the digital signal is selected, then mixing the digital signal with a signal generated by a numerical controlled oscillator.

12. The method of claim 10, wherein the step of mixing a signal selected from the digital signal and the analog signal comprises:

if the analog signal is selected, then mixing the analog signal with a signal generated by a voltage controlled oscillator.

13. The method of claim 10, wherein the step of filtering said mixed signal comprises:

performing a low pass filtering operation on said mixed signal.

14. The method of claim 10, wherein the step of filtering said mixed signal comprises:

performing a band pass filtering operation on said mixed signal.

15. The method of claim 10, wherein the step of filtering said mixed signal comprises:

performing a high pass filtering operation on said mixed signal.

16. A frequency synthesizer, comprising:

a first multiplexer;

a first memory unit, coupled to said first multiplexer, for storing a first reference frequency;

a second memory unit, coupled to said first multiplexer, for storing a second reference frequency;

a shift register, for storing a target frequency and comparing the target frequency with a predetermined value; and a control unit, coupled to said shift register, said control unit based on a result of comparing said target frequency with said predetermined value selecting one of said first reference frequency and said second reference frequency passes said first multiplexer.

17. The frequency synthesizer of claim 16, wherein said shift register is a linear feedback shift register.

18. The Frequency synthesizer of claim 17, wherein said result of comparing said target frequency with said predetermined value determines one of said first reference frequency and said second reference frequency passes said first multiplexer, and said target frequency then shifts one bit responsive to said clock signal for comparing with said predetermined value again until a frequency resolution cannot distinguish a difference between said target frequency and said predetermined value.

19. The frequency synthesizer of claim 17, wherein the number of stages of said linear feedback shift register determines said frequency resolution, said frequency resolution is a ratio of a difference between said first frequency and said second frequency to a base 2 multiple exponential, and said multiple is a number of said stages of said linear feedback shift register.

* * * * *